(12) United States Patent
Gallant et al.

(10) Patent No.: US 11,160,334 B2
(45) Date of Patent: Nov. 2, 2021

(54) FASTENER ELEMENT SHAPE

(71) Applicant: Velcro IP Holdings LLC, Manchester, NH (US)

(72) Inventors: Christopher M. Gallant, Nottingham, NH (US); Luis Parellada Armela, Argentona (ES); Stephen R. Arata, Kingston, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 192 days.

(21) Appl. No.: 15/680,447

(22) Filed: Aug. 18, 2017

(65) Prior Publication Data
US 2019/0053582 A1 Feb. 21, 2019

(51) Int. Cl.
*A44B 18/00* (2006.01)
*B29C 43/46* (2006.01)
(Continued)

(52) U.S. Cl.
CPC ...... *A44B 18/0069* (2013.01); *A44B 18/0049* (2013.01); *A44B 18/0065* (2013.01);
(Continued)

(58) Field of Classification Search
CPC ............ A44B 18/0015; A44B 18/0019; A44B 18/0046; A44B 18/0049; A44B 18/0061; A44B 18/0065; A44B 18/0069; Y10T 24/2792; B29C 43/222; B29C 43/46; B29C 2043/461; B29C 43/28; B32B 3/30; B32B 3/26; B29L 2031/729
(Continued)

(56) References Cited

U.S. PATENT DOCUMENTS 2,820,277 A 1/1958 Forster
3,138,841 A 6/1964 Naimer
(Continued)

FOREIGN PATENT DOCUMENTS

DE 2213686 10/1972
DE 44 41 095 5/1996
(Continued)

OTHER PUBLICATIONS

International Search Report and Written Opinion in International Application No. PCT/EP2018/071959, dated Oct. 24, 2018, 12 pages.

*Primary Examiner* — Theodore V Adamos
(74) *Attorney, Agent, or Firm* — Fish & Richardson P.C.

(57) ABSTRACT

A touch fastener product having a base sheet with a resin side surface and a male touch fastener element having a head disposed at a distal end of a resin stem and overhanging the base sheet. The head has an overall shape, as projected in a plane parallel to the base sheet, with a perimeter that defines spaced apart extremities corresponding to head sections of different engagement characteristics and disposed at different distances from a centroid of the overall shape. In one example, the head projection has a polygonal perimeter consisting of straight edges of differing lengths connected at radiused corners. In another, the perimeter comprises an unbroken series of at least three arc segments of different curvatures, with centers of the arc segments disposed at different distances from the centroid.

19 Claims, 6 Drawing Sheets

(51) Int. Cl.
*B29C 43/22* (2006.01)
*B32B 3/30* (2006.01)
*B29L 31/00* (2006.01)
*B29C 43/28* (2006.01)
*B32B 3/26* (2006.01)

(52) U.S. Cl.
CPC ............ *B29C 43/222* (2013.01); *B29C 43/46* (2013.01); *B32B 3/30* (2013.01); *A44B 18/0046* (2013.01); *B29C 43/28* (2013.01); *B29C 2043/461* (2013.01); *B29L 2031/729* (2013.01); *B32B 3/26* (2013.01)

(58) Field of Classification Search
USPC ........................... 24/442, 449, 452, 446, 450
See application file for complete search history.

(56) References Cited

U.S. PATENT DOCUMENTS

| | | |
|---|---|---|
| 3,191,255 A | 6/1965 | Nealis |
| 3,192,589 A | 7/1965 | Pearson |
| 3,266,113 A | 8/1966 | Flanagan |
| 3,312,583 A | 4/1967 | Rochlis |
| 3,399,425 A | 9/1968 | Lemelson |
| 3,408,705 A | 11/1968 | Kayser et al. |
| 3,527,001 A | 9/1970 | Kleemeier et al. |
| 3,557,407 A | 1/1971 | Lemelson |
| 3,718,725 A | 2/1973 | Hamano |
| 3,808,648 A | 5/1974 | Billarant et al. |
| 4,169,303 A | 10/1979 | Lemelson |
| 4,290,174 A | 9/1981 | Kalleberg |
| 4,454,183 A | 6/1984 | Wollman |
| 4,775,310 A | 10/1988 | Fischer |
| 4,794,028 A | 12/1988 | Fischer |
| 4,811,468 A | 3/1989 | Yamada |
| 4,880,589 A | 11/1989 | Shigemoto et al. |
| 5,076,793 A | 12/1991 | Aghevli et al. |
| 5,077,870 A | 1/1992 | Melbye et al. |
| 5,505,747 A | 4/1996 | Chesley et al. |
| 5,607,635 A | 3/1997 | Melbye et al. |
| 5,657,516 A | 8/1997 | Berg et al. |
| 5,679,302 A | 10/1997 | Miller et al. |
| 5,713,111 A | 2/1998 | Hattori et al. |
| 5,749,129 A | 5/1998 | Murasaki et al. |
| 5,755,015 A | 5/1998 | Akeno et al. |
| 5,781,969 A | 7/1998 | Akeno et al. |
| 5,792,408 A | 8/1998 | Akeno et al. |
| 5,800,845 A | 9/1998 | Akeno et al. |
| 5,845,375 A | 12/1998 | Miller et al. |
| 5,868,987 A | 2/1999 | Kampfer et al. |
| 5,879,604 A | 3/1999 | Melbye et al. |
| 5,895,388 A | 4/1999 | Zobel |
| 5,951,931 A | 9/1999 | Murasaki et al. |
| 5,953,797 A | 9/1999 | Provost et al. |
| 5,981,027 A | 11/1999 | Parellada |
| 5,983,467 A * | 11/1999 | Duffy ................. A44B 18/0046 24/442 |
| 6,000,106 A | 12/1999 | Kampfer et al. |
| 6,039,911 A | 3/2000 | Miller et al. |
| 6,054,091 A | 4/2000 | Miller et al. |
| 6,162,040 A | 12/2000 | Clune |
| 6,234,886 B1 | 5/2001 | Rivard et al. |
| 6,248,276 B1 * | 6/2001 | Parellada ............ A44B 18/0049 264/167 |
| 6,287,665 B1 | 9/2001 | Hammer |
| 6,299,954 B1 | 10/2001 | Schulte |
| 6,393,673 B1 | 5/2002 | Kourtidis et al. |
| 6,708,378 B2 | 3/2004 | Parellada et al. |
| 2009/0035509 A1* | 2/2009 | Kurtz, Jr. ............ A44B 18/0015 428/100 |
| 2011/0265293 A1* | 11/2011 | Idrizovic ............ A44B 18/0061 24/452 |
| 2012/0151722 A1* | 6/2012 | Hertlein ............. A44B 18/0065 24/591.1 |
| 2013/0067702 A1* | 3/2013 | Tuma ................. A44B 18/0049 24/450 |

FOREIGN PATENT DOCUMENTS

| | | |
|---|---|---|
| DE | 29608260 | 8/1996 |
| EP | 0 806 158 | 11/1997 |
| EP | 0811332 | 12/1997 |
| EP | 0 852 918 | 7/1998 |
| EP | 0 891 724 | 1/1999 |
| EP | 1656848 | 5/2006 |
| GB | 2279106 | 12/1994 |
| WO | WO 82/02480 | 8/1982 |
| WO | WO 92/04839 | 4/1992 |
| WO | WO 94/23610 | 10/1994 |
| WO | WO 98/14086 | 4/1998 |
| WO | WO 98/20767 | 5/1998 |
| WO | WO 98/25495 | 6/1998 |
| WO | WO 98/30381 | 7/1998 |
| WO | WO 98/57564 | 12/1998 |
| WO | WO 98/57565 | 12/1998 |
| WO | WO 99/20880 | 4/1999 |
| WO | WO 99/26507 | 6/1999 |
| WO | WO 99/59441 | 11/1999 |
| WO | WO 99/60879 | 12/1999 |
| WO | WO 00/00053 | 1/2000 |
| WO | WO 00/007792 | 2/2000 |
| WO | WO 00/16670 | 3/2000 |
| WO | WO 00/16671 | 3/2000 |
| WO | WO 00/18556 | 4/2000 |
| WO | WO 00/25620 | 5/2000 |
| WO | WO 00/29189 | 5/2000 |
| WO | WO 00/41479 | 7/2000 |
| WO | WO 01/12022 | 2/2001 |
| WO | WO 01/24654 | 4/2001 |
| WO | WO 01/32044 | 5/2001 |
| WO | WO 01/37694 | 5/2001 |
| WO | WO 01/37710 | 5/2001 |
| WO | WO 02/02422 | 1/2002 |
| WO | WO 02/45536 | 6/2002 |
| WO | WO 03/028499 | 4/2003 |

* cited by examiner

FASTENER ELEMENT SHAPE

TECHNICAL FIELD

This invention relates to male touch fastener products, such as for releasable engagement with a mating touch fastener product, and shapes of fastener elements for such products.

BACKGROUND

Touch fasteners are useful for releasable engagement of surfaces in products ranging from diapers to construction materials. In most cases, the engagement is between an array of very small male fastener elements and a field of fibers or loops, but in some cases heads of the male fastener elements can be shaped and spaced so as to releasably engage a similar array. Some male fastener elements have heads that overhang along only one lateral direction, while others overhang in multiple directions (or in all directions). The former (often referred to as J-shaped or palm tree fasteners) tend to have very directional engagement characteristics, whereas the latter (often referred to as mushroom-shaped fasteners) have engagement characteristics that are more uniform in all directions. Each type of male fastener element has its preferred uses in commercial products. Mushroom-shaped fastener elements can be made with fairly thin heads, for engagement with very low loft fibers as tend to be found in inexpensive non-woven materials. Improvements in fastener element shape, and in methods of making such shapes, are continually sought.

SUMMARY

According to one aspect of the invention, a male touch fastener product has a base sheet with a resin side surface, and at least one male touch fastener element (or several, or an array of touch fastener elements) extending integrally from the resin side surface. The (or each) fastener element has a resin stem extending integrally from the resin side surface of the base sheet, and a head disposed at a distal end of the stem and overhanging the base sheet on at least three sides of the stem. The head has an underside surface of resin, and the resin side surface of the base sheet, the stem, and the underside surface of the head together form a seamless mass of resin. The head has an overall shape, as projected in a plane parallel to the base sheet side surface, with a perimeter and an area defining a centroid. The perimeter defines spaced apart extremities that correspond to head sections of different engagement characteristics, and the extremities comprise at least three extremities disposed at different distances from the centroid.

By "extremities" we mean points on the perimeter corresponding to local maxima and minima of the distance of the perimeter from the centroid. An externally facing extremity corresponds to a local maximum of the perimeter-centroid distance, and an internally facing extremity corresponds to a local minimum of the perimeter-centroid distance.

By "engagement characteristics" of an extremity, we mean physical attributes of the head in the vicinity of the extremity that are related to the ability of the head to engage and/or retain fibers about that extremity. These can include, for example, perimeter surface curvature, head thickness, surface roughness, edge features, and head stiffness.

References to "different" values mean differences at least twice the reasonable tolerancing of those values under typical manufacturing conditions. For example, if the reasonable tolerancing of a physical dimension is +/−0.01 mm, then "different" such dimensions would differ by at least 0.02 mm.

By a "seamless mass of resin" we mean that it has a structure as if all the resin has solidified together, as opposed to separate resin portions that are merely mechanically coupled. By seamless we do not mean to imply that the resin mass has no knit lines where molten flows joined before solidification.

In some embodiments, the head has an upper surface that is generally flat over most of the area of its projected shape, including at the centroid. The upper surface may be parallel to the side surface of the base sheet. By "generally flat" we mean as if molded against a surface generally equidistant from a datum to within reasonable process tolerancing. In terms of the upper surface of the head, we mean to distinguish, for example, hemispherical surfaces and surfaces from which other fastening features project. We do not mean perfectly smooth.

In some cases, the extremities are all rounded corners of the perimeter, connected by perimeter side edges. By "radiused" or "rounded" we mean generally curved and do not mean to imply of constant curvature or any particular curvature. In some examples, at least three of the corners are of different curvature. Preferably, at least three of the side edges are of different lengths. In some cases, the different lengths differ from each other by at least ten percent of the largest of the lengths.

In some embodiments, the perimeter side edges are relatively straight. By "straight" we mean straight within reasonable process tolerancing. For example, for a molded edge we mean within the ability of the molding process to generate and maintain a straight edge. The perimeter may consist of four side edges connecting four rounded corners.

In some embodiments, the extremities comprise centers of two convex arc segments and a center of one concave arc segment connecting the convex arc segments. In some examples, the perimeter consists of four arc segments. By "arc segments" we mean a segment that is generally curved and without inflection. We do not mean to imply that an arc segment is necessarily of constant radius or curvature.

The projected shape of the head is preferably non-symmetric about all lines parallel to the base sheet.

In many applications, the different distances from the centroid differ from each other by at least ten percent of the largest of the distances, and in some cases by at least fifteen percent.

In some embodiments, the base sheet has a layer of resin laminated to a carrier sheet and covering only a limited area of the carrier sheet, such that the carrier sheet is exposed beyond the base sheet. The layer may be in the form of spaced apart islands of resin separated by exposed carrier sheet surrounding each island, for example, or one or more longitudinally continuous lanes of resin extending along the carrier sheet.

The fastener element preferably extends less than 0.5 millimeter from the side surface of the base sheet, and in some cases less than 0.3 millimeter.

Preferably, the fastener element is one of an array of fastener elements extending from the side surface of the base sheet, in a density of at least 150 fastener elements per square centimeter.

According to another aspect of the invention, a male touch fastener product has a base sheet with a resin side surface, and at least one male touch fastener element (or several, or an array of touch fastener elements) extending integrally from the resin side surface. The (or each) fastener element has a resin stem extending integrally from the resin side surface of the base sheet, and a head disposed at a distal end of the stem and overhanging the base sheet on at least three sides of the stem. The head has an underside surface of resin, and the resin side surface of the base sheet, the stem, and the underside surface of the head together form a seamless mass of resin. The head has an overall shape, as projected in a plane parallel to the base sheet side surface, with a polygonal perimeter consisting of straight edges connected at rounded corners. For each group of three adjacent edges of the perimeter, all of the edges of the group are of different lengths.

In some cases, all edges of the perimeter are of different lengths.

Preferably, the different lengths differ from each other by at least ten percent of the largest of the lengths.

In some embodiments, the head has an upper surface that is generally flat over most of the area of its projected shape, including at the centroid. The upper surface may be parallel to the side surface of the base sheet.

In some examples, at least three of the rounded corners are of different curvature.

In some embodiments, the base sheet has a layer of resin laminated to a carrier sheet and covering only a limited area of the carrier sheet, such that the carrier sheet is exposed beyond the base sheet. The layer may be in the form of spaced apart islands of resin separated by exposed carrier sheet surrounding each island, for example, or one or more longitudinally continuous lanes of resin extending along the carrier sheet.

The fastener element preferably extends less than 0.5 millimeter from the side surface of the base sheet, and in some cases less than 0.3 millimeter.

Preferably, the fastener element is one of an array of fastener elements extending from the side surface of the base sheet, in a density of at least 150 fastener elements per square centimeter.

According to yet another aspect of the invention, a male touch fastener product has a base sheet with a resin side surface, and at least one male touch fastener element (or several, or an array of touch fastener elements) extending integrally from the resin side surface. The (or each) fastener element has a resin stem extending integrally from the resin side surface of the base sheet, and a head disposed at a distal end of the stem and overhanging the base sheet on at least three sides of the stem. The head has an underside surface of resin, and the resin side surface of the base sheet, the stem, and the underside surface of the head together form a seamless mass of resin. The head has an overall shape, as projected in a plane parallel to the base sheet side surface, with a perimeter and an area defining a centroid. The perimeter includes an unbroken series of at least three arc segments of different curvature, and centers of the arc segments are disposed at different distances from the centroid.

By "unbroken" we mean that the series of arc segments is uninterrupted by other perimeter features connecting the arc segments, but that each two adjacent segments of the series share endpoints.

The different distances from the centroid preferably differ from each other by at least ten percent, or in some cases fifteen percent, of the largest of the distances.

In some embodiments, the head has an upper surface that is generally flat over most of the area of its projected shape, including at the centroid. The upper surface may be parallel to the side surface of the base sheet.

In some embodiments, the base sheet has a layer of resin laminated to a carrier sheet and covering only a limited area of the carrier sheet, such that the carrier sheet is exposed beyond the base sheet. The layer may be in the form of spaced apart islands of resin separated by exposed carrier sheet surrounding each island, for example, or one or more longitudinally continuous lanes of resin extending along the carrier sheet.

The fastener element preferably extends less than 0.5 millimeter from the side surface of the base sheet, and in some cases less than 0.3 millimeter.

Preferably, the fastener element is one of an array of fastener elements extending from the side surface of the base sheet, in a density of at least 150 fastener elements per square centimeter.

Other aspects of the invention feature methods of making the above-described male touch fastener products, such as by molding the fastener elements in specially-shaped cavities of a mold roll or sleeve while forming the side surface of the base sheet on the outer surface of the roll or sleeve.

Yet other aspects of the invention feature disposable garments having the above-described male touch fastener products arranged to releasably engage mating fibrous surfaces of the garment to secure the garment on a wearer. The garment may be, for example, a disposable diaper or training pant.

Various examples of the invention can provide fastener products that are particularly useful in the engagement of irregular landing zones of personal care products such as disposable diapers, particularly engagement of spun-bound non-woven materials having non-uniform loop height/length/diameter. Providing the fastener element with a particularly irregular, asymmetric shape with features of different engagement characteristics may augment the ability of the fastener element to engage a wide variety of fibrous loops, even within the same landing zones. The irregularity of perimeter shape of a relatively flat head can enable the fastener elements of an array to be arranged in different orientations to provide differing fastening characteristics in different orientations of the array or of different elements within the array. This can better optimize fastening peel and shear performance characteristics, for example, of the product. A relatively longer edge, for example, may help the fastener element to "dig into" the loop for longer and stronger engagement, while different radii of rounded corners may allow the loop to re-catch after initial disengagement, when engaged on multiple corners. For example, when an engaged loop slides off of a larger corner it may still be retained on smaller corners.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
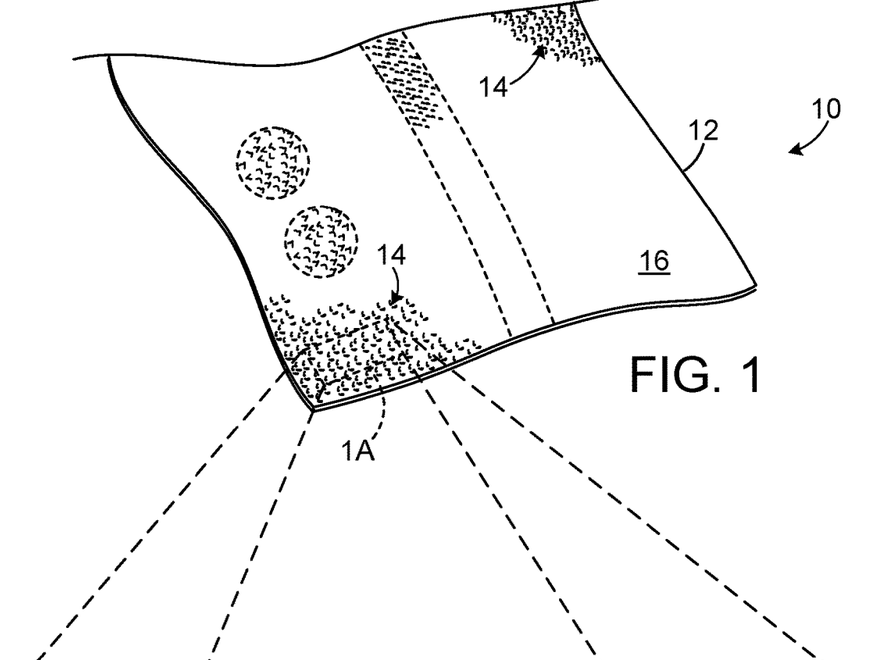
FIG. 1 is a perspective view of a portion of sheet-form fastener product.

Referring first to FIG. 1, fastener product 10 has a base sheet 12 of resin and an array of male touch fastener elements 14 extending from a broad resin side surface 16 of the base sheet. To give some proportion, base sheet 12 is about 0.8 mm thick and can be up to two meters or more in width, and can be manufactured in continuous length and rolled for transport. The fastener elements are arranged in an array on the base sheet surface, with a density of about 220-260 per square centimeter, each fastener element extending only about 0.25 mm from the base sheet surface. For purposes of illustration, fastener elements are shown in only limited areas of the base sheet, but in many examples the array of fastener elements will essentially cover the sheet. As shown in dashed outline, in some cases the fastener elements are arranged in discrete islands or continuous lanes that may be isolated regions of base sheet laminated to a broader carrier sheet. In other words, the base sheet 12 may be formed as one or more strips or separated islands of resin laminated to a wider carrier, such as a fabric (not shown).

Figure 1A:
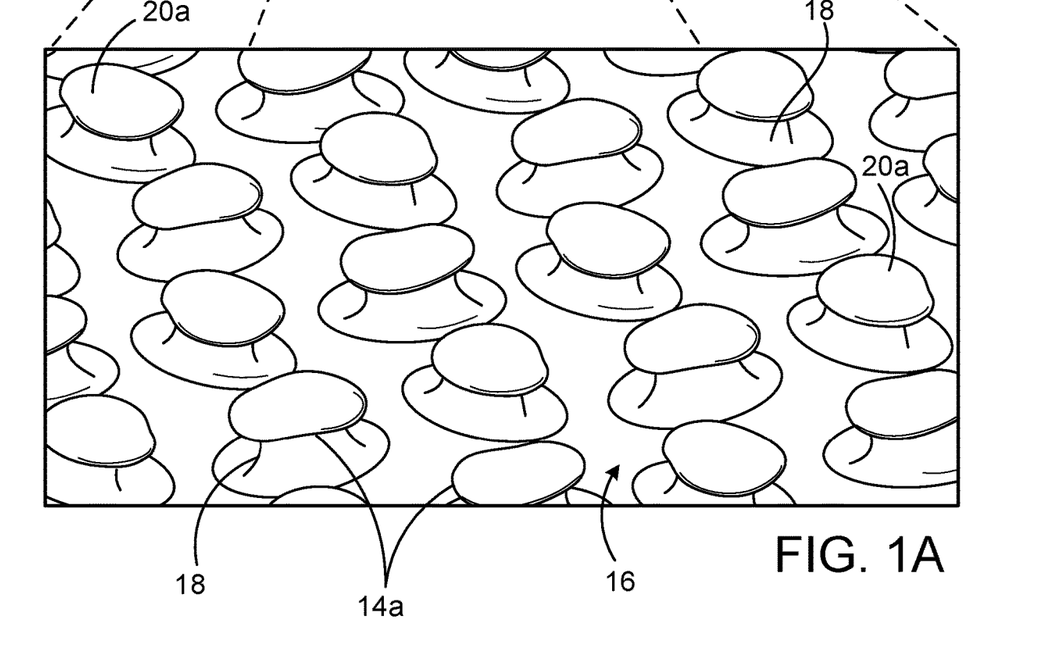
FIG. 1A is an enlarged view of area 1A of FIG. 1, showing a number of individual male fastener elements.

Referring next to FIG. 1A, in one example the fastener elements 14 are fastener elements 14a with heads that can be described as kidney-shaped. Each fastener element 14a has a resin stem 18 extending integrally from the resin side surface 16 of the base sheet. A kidney-shaped head 20a is disposed at a distal end of each stem and overhangs the base sheet on at least three sides of the stem. In this example, as will be seen in later views, heads 20a overhang the base on all sides of the stems, forming an undercut for securing fibers or fastener element heads of a mating fastener product. Each head 20a has an underside surface of resin that, together with the resin side surface of the base sheet and the stem, forms a seamless mass of resin. In this case, the entirety of each fastener element, and the base sheet, are all formed from the same resin in a roll-forming process that will be discussed below. As shown, the orientation of the head shapes of fastener elements 14a varies across the array. Specifically, the heads of adjacent fastener elements are oriented in different directions, and each row and each column comprises heads of two different orientations.

Figure 2:
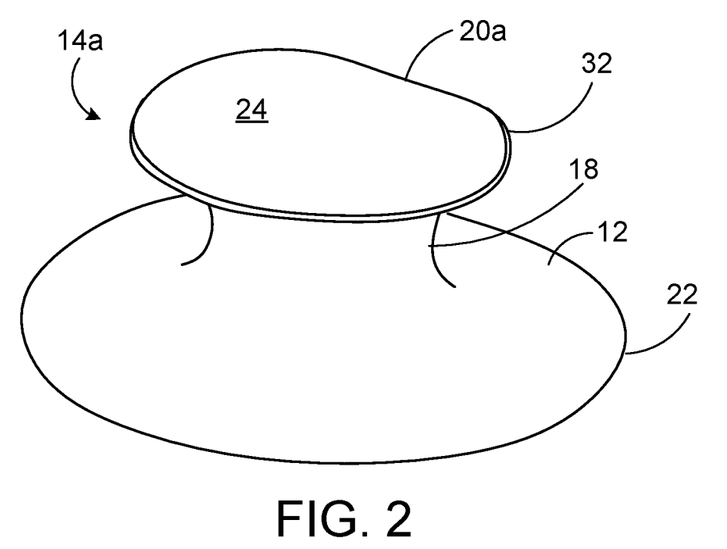
FIG. 2 is an enlarged perspective view of a single fastener element of FIG. 1A.
Figure 3:
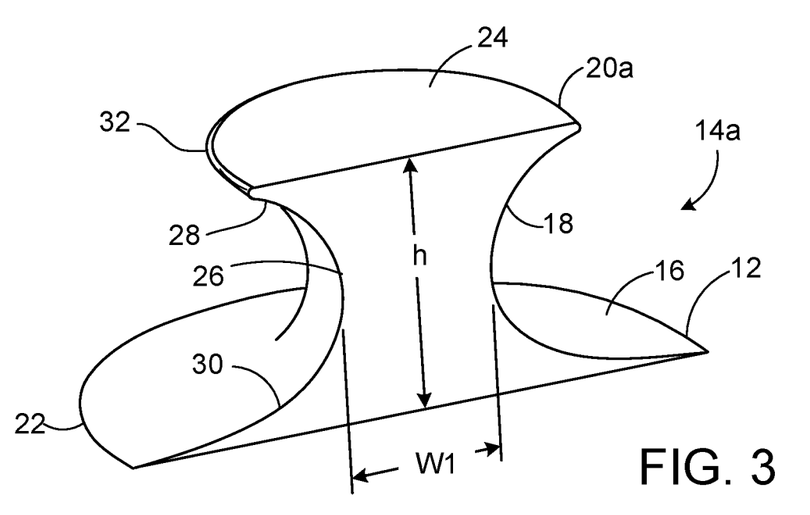
FIG. 3 is a cut-away view of the fastener element of FIG. 2, cut along a vertical plane.

In FIGS. 2 and 3, fastener element 14a is shown as molded with a small base sheet 12 having a perimeter edge 22 and laminated to a surface of an underlying fabric (not shown), but is otherwise of the same shape and structure as the fastener elements shown in FIG. 1A. Head 20a has an upper surface 24 that is generally flat and parallel to base sheet 12 over most of the area of its projected shape, including at every point directly over the narrowest cross-section of stem 18. In this example (and the one described below), the head is generally flat over more than 90% of its projected area. The stem sides 26, the underside 28 of the head, and the overhung portion 30 of the base sheet together form a smooth arc to the distal edge 32 of the head, which is lightly rounded. The entire fastener element has a height 'h' of only about 0.25 mm, and the narrowest width 'w1' of the stem in this cross-section is about 45% of the overall width of the head in the same cross-section.

Figure 4:
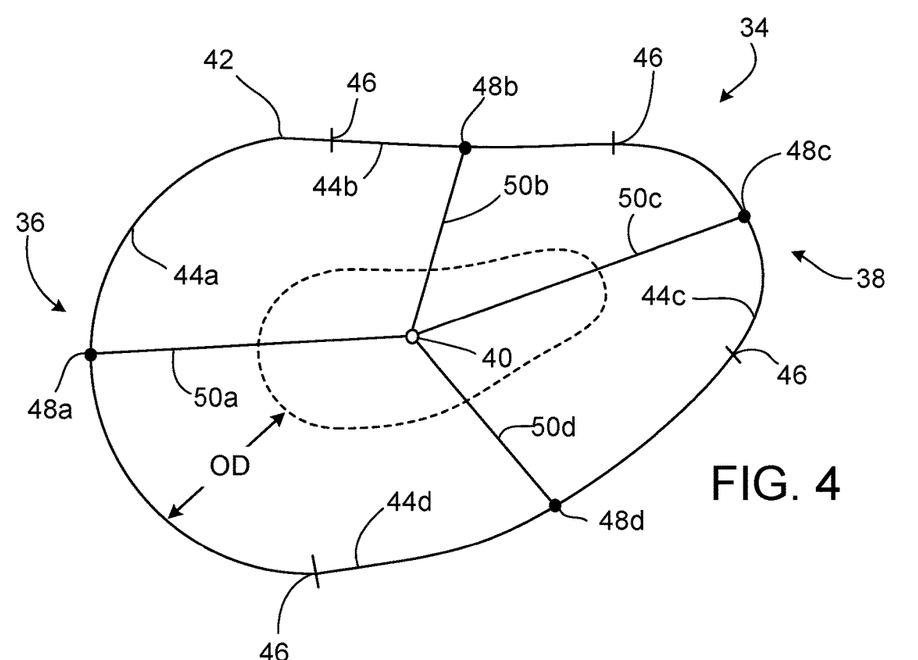
FIG. 4 shows the projection of the head of the fastener element of FIG. 2, in a plane parallel to the base sheet side surface.

Referring next to FIG. 4, the vertical projection 34 of the head (onto a plane parallel to the base sheet) has an overall shape that can be described as somewhat bean-shaped or kidney-shaped, with a relatively wider end 36 and a relatively narrow end 38. This shape is not symmetric about any line in its plane. The area of the projection defines a centroid 40, and the perimeter 42 is made up of four distinct arc segments 44a-d connected at arc segment endpoints 46. Of the four arc segments, only one (44b) is concave with respect to the overall shape. The other three are convex. Each arc segment has a corresponding center 48a-d equidistant from the endpoints 46 that bound that segment. The spaced-apart arc segment centers 48a-d are 'extremities' as that term is used herein, and correspond to head sections of different engagement characteristics. In this case, the four centers 48a-d correspond to head sections of differing curvatures that represent features of differing engagement properties. For example, center 48a (of arc segment 44a) corresponds to the relatively wide end 36 of the head, which will tend to engage somewhat differently than the narrow end 38 of the stem (corresponding to arc segment 44c with center 48c). Arc segment center 48d, of arc segment 44d, corresponds to the portion of the head of lowest overall curvature and which will present a different engagement attribute than either end of the head. Arc segment center 44b is of the only concave arc segment 44b of the shape, and corresponds to an indentation in the long side of the head, and as such, will have engagement characteristics that differ from any of the other three extremities.

The arc segment centers 48a-d are each disposed at different distances 50a-d from centroid 40. In this example, distance 50c is the longest and distance 50b the shortest. Normalizing the distances to the longest distance 50c, distances 50a-d are 0.89, 0.56, 1.00 and 0.62, respectively. The different distances from the centroid thus differ from each other by at least ten percent of the largest of the distances.

The outline of the narrowest cross-section of the fastener element stem is shown in dashed line. The size and shape of this cross-section is approximate and is just to indicate that the stem itself is of an irregular shape. Nominally, the overhang distance 'OD' between the innermost stem surface and the perimeter of the projection shape is about 0.11 mm.

Figure 5:
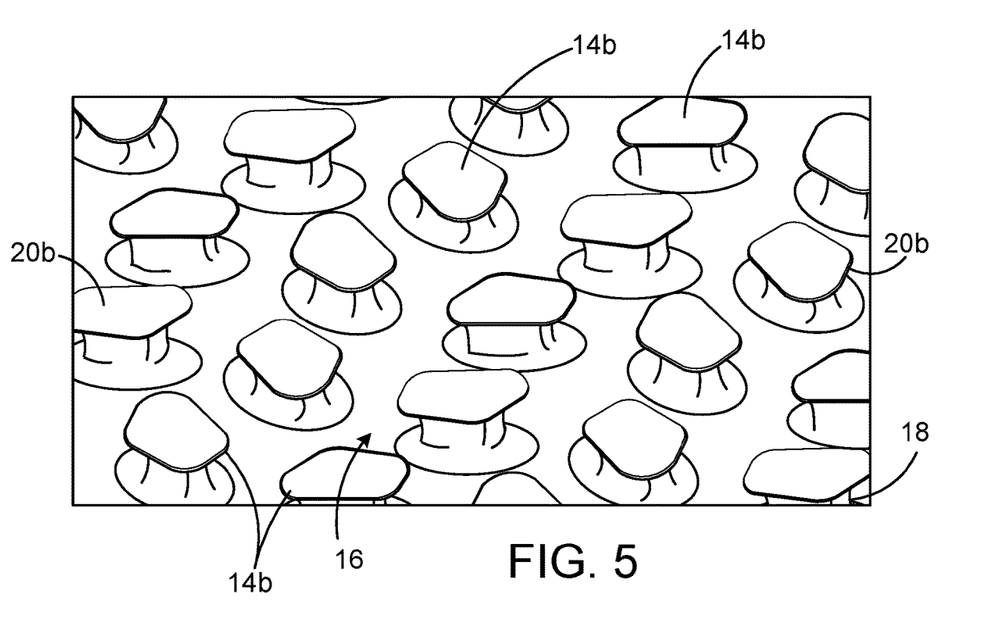
FIG. 5 is an enlarged view of a portion of an array of fastener elements of a second shape.

The array of fastener elements 14b shown in FIG. 5 are similar to those discussed above, but for the fastener element shape. They are an example of the array of fastener elements 14 of product 10 shown in FIG. 1. Other than the shape of the stems and heads, the array of fastener elements 14b is identical to the one described above. The shape of heads 20b of fastener elements 14b can be described as generally polygonal.

Figure 6:
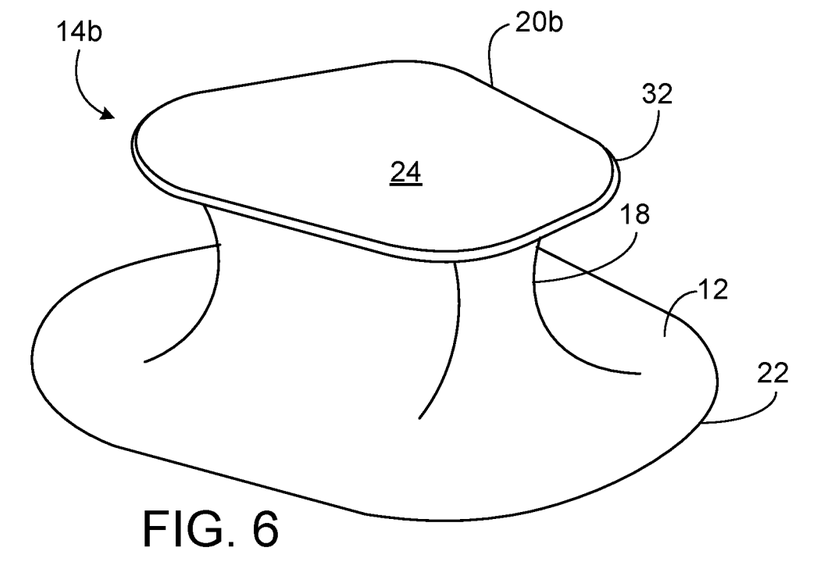
FIG. 6 is an enlarged perspective view of a single fastener element of the array of FIG. 5.
Figure 7:
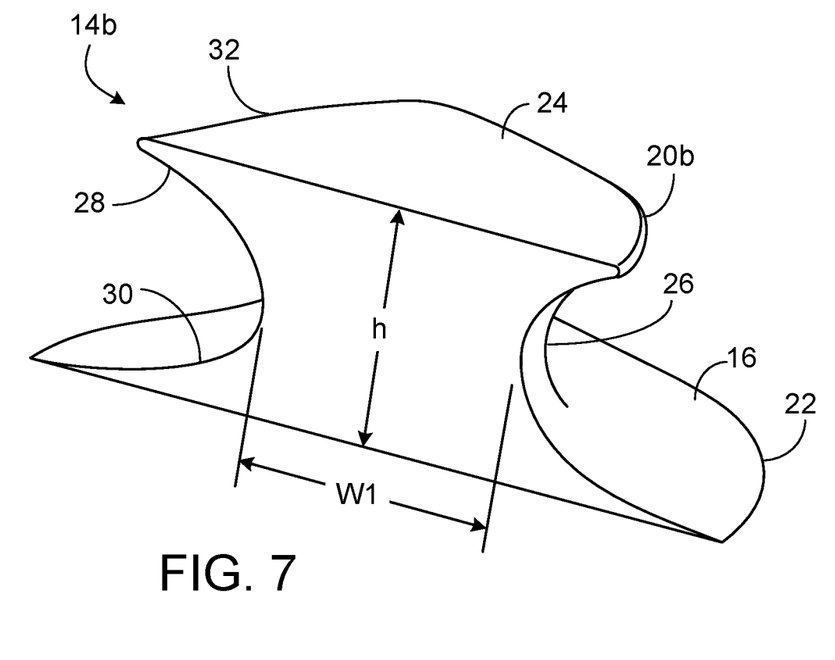
FIG. 7 is a cut-away view of the fastener element of FIG. 6, cut along a vertical plane.

Referring also to FIGS. 6 and 7, fastener element 14b is similarly shown as molded with a small base sheet 12 having a perimeter edge 22 and laminated to a surface of an underlying fabric (not shown). Head 20b has an upper surface 24 that is generally flat and parallel to base sheet 12 over most of the area of its projected shape, including at every point directly over the narrowest cross-section of stem 18. The stem sides 26, the underside 28 of the head, and the overhung portion 30 of the base sheet together form a smooth arc to the distal edge 32 of the head, which is lightly rounded as in the previous example. The entire fastener element has a height 'h' of only about 0.25 mm, and the narrowest width 'w1' of the stem in this cross-section is about 52% of the overall width of the head in the same cross-section.

Figure 8:
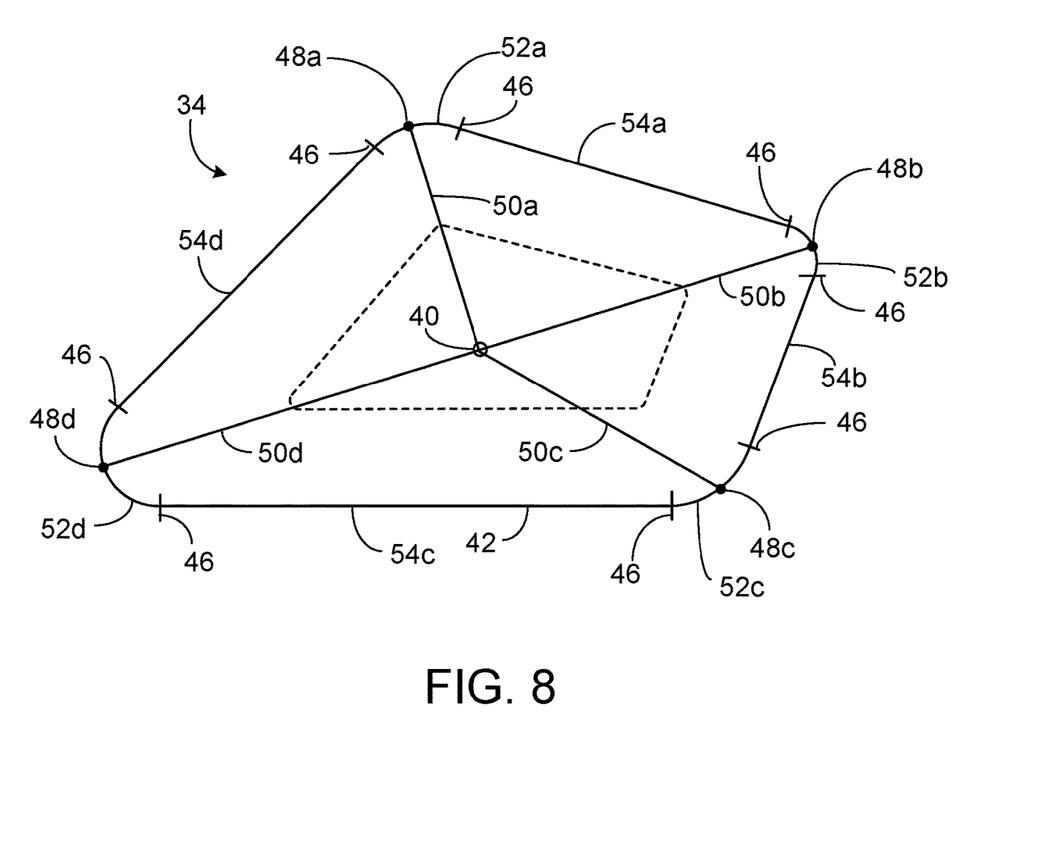
FIG. 8 shows the projection of the head of the fastener element of FIG. 6, in a plane parallel to the base sheet side surface.

Referring next to FIG. 8, the vertical projection 34 of the head (onto a plane parallel to the base sheet) has an overall shape that can be described as a four-sided polygon, with lightly rounded corners. Like the example discussed above, this shape is not symmetric about any line in its plane. The area of the projection defines a centroid 40, and the perimeter 42 is made up of four distinct corners 52a-d in the shape of arc segments, connected at arc segment endpoints 46 to straight sides 54a-d. Each corner has a corresponding center 48a-d equidistant from the endpoints 46 that bound that corner. The spaced-apart corner centers 48a-d are 'extremities' as that term is used herein, and correspond to head corners of different engagement characteristics. In this case, the four centers 48a-d correspond to corners of differing included angles, providing differing engagement properties. For example, center 48a (of corner 52a) corresponds to the corner of the greatest included angle, which will tend to engage somewhat differently than corner 52d having the narrowest included angle. The corners also all differ in their engagement characteristics by being of differing curvatures. In some examples, not all of the corners are of different curvature. For example, two corners may have identical corner radii. Some corners may be essentially sharp (of negligible radius).

The corner centers 48a-d are each disposed at different distances 50a-d from centroid 40. In this example, distance 50d is the longest and distance 50a the shortest. Normalizing the distances to the longest distance 50d, distances 50a-d are 0.58, 0.90, 0.73 and 1.00, respectively. The different distances from the centroid thus differ from each other by at least ten percent of the largest of the distances, as in the previous example. The four straight edge segments 54a-d are also of four different lengths, as measured between endpoints 46. In another example (not shown), two of the straight edge segments are of equal length. We also note that the two straight edge segments bounding each corner are of different lengths, and that for each straight edge segment, the two adjacent straight edge segments are also of differing lengths that also differ from the length of that segment. In other words, for each group of three adjacent edges of the perimeter, all of the edges of the group are of different lengths. In this example, the straight edge segment 54c is the longest and 54b the shortest. Normalizing the lengths to the length of the longest segment 54c, the lengths of straight edge segments 54a-d are 0.67, 0.36, 1.00 and 0.70, respectively. Thus, the different lengths differ from each other by at least ten percent of the largest of the lengths.

While these characteristics are illustrated in a polygonal shape of four sides, it will be clear how such characteristics can be designed into shapes of 3, 5, 6 or more sides. However, polygonal head shapes of 3-5 sides are generally preferred.

The outline of the narrowest cross-section of the fastener element stem is shown in dashed line. The size and shape of this cross-section is approximate and is just to indicate that the stem itself is of an irregular, polygonal shape. Nominally, the overhang distance 'OD' between the innermost stem surface and the perimeter of the projection shape is about 0.11 mm.

Figure 9:
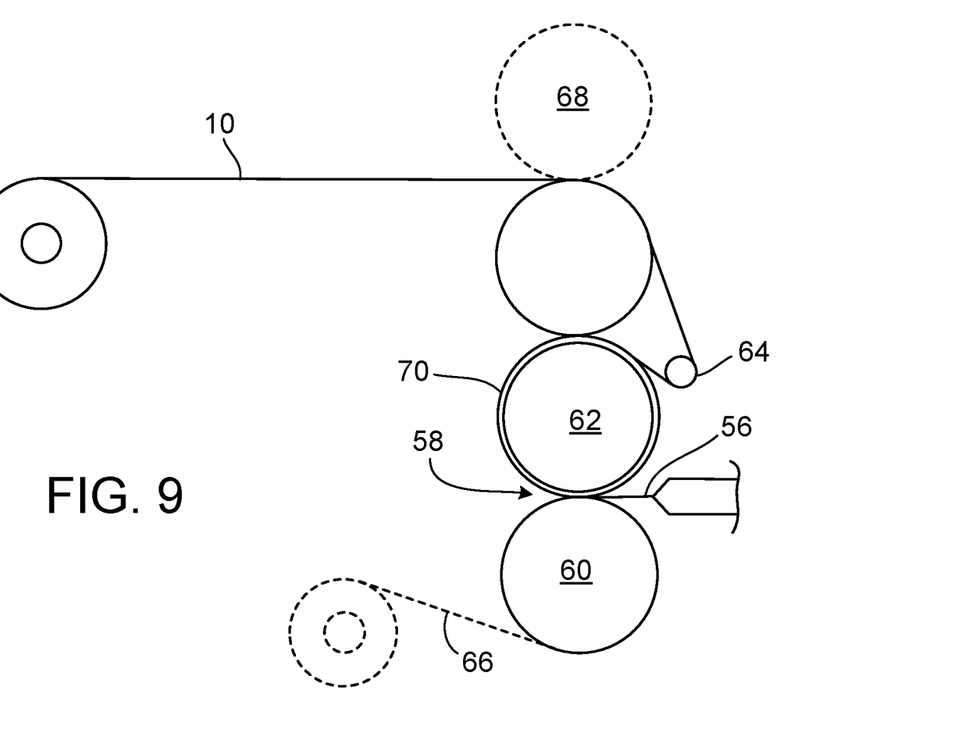
FIG. 9 is a schematic representation of an apparatus and method for producing sheet-form fastener products having fastener elements of the shapes described herein.

Referring next to FIG. 9, resin fastener products such as shown in FIG. 1 (with either of the two fastener element arrays described above, or any combination of the two) can be made in a continuous roll-molding process in which molten resin 56 is introduced into a nip 58 between two counter-rotating rolls including a pressure roll 60 and a mold roll 62 that defines cavities in the shape of the above fastener elements. Pressure in nip 58 forces the resin into the cavities, where it solidifies as contiguous resin solidifies on the surface of the roll before being stripped off of the mold roll by being passed around a stripper roll 64 and then spooled for storage. In some cases a preformed web 66 is introduced to the nip with the resin, such that while some of the resin is filling the cavities to form the fastener elements, resin forming the base sheet is laminated directly to the web surface, such as by the resin intermingling with surface features of the web, partially penetrating the web surfaces in the case of a fibrous web. The spooled product in that cases comprises the web with the base sheet of resin on one side of the web, and the array of fastener elements extending from the base sheet. The resin can be introduced to the nip in discontinuous volumes to form the base sheet in separate islands or patches or width-wise continuous lanes, each bearing fastener elements. The resin can also be introduced in multiple, spaced apart lanes across the width of the web, to form a fastener product with continuous, longitudinal lanes of fastener elements separated by lanes of exposed web surface.

It is preferred that the heads of the fastener elements be molded in finished form in the cavities of mold roll 62. However, heads may alternatively be formed after molding of stems on the base sheet, such as by engaging distal ends of the stems with a heated roller 68 that plastically deforms the stem ends to create flat heads. The overall structure of the fastener elements in such cases will be somewhat different than that shown in the figures, particularly in the region of the underside of the head. Furthermore, the shape and dimensions of the projection of the head will tend to be somewhat less controlled than in the case of a molded head. Roll 68 may also be employed to lightly engage the tops of molded heads, such as to flatten any head edges that have been somewhat raised by extraction from the mold cavities.

Figure 10:
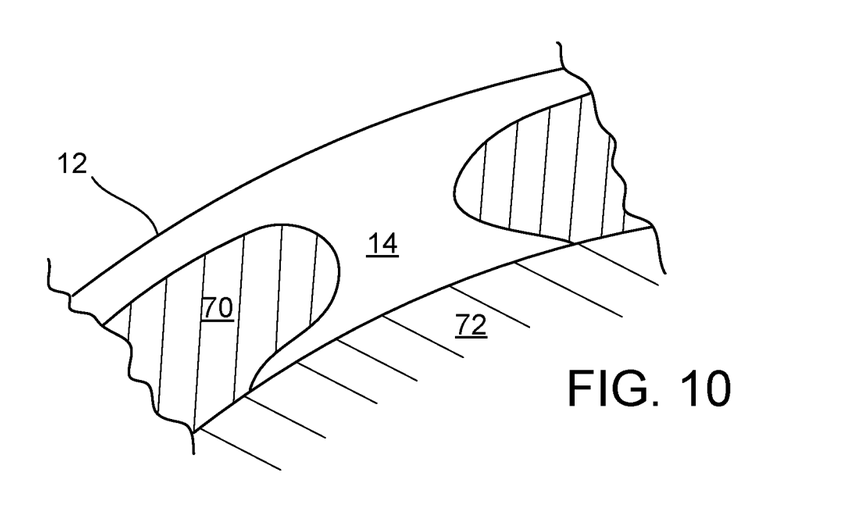
FIG. 10 is an enlarged cross-section view through an edge section of the mold roll of the apparatus of FIG. 9, showing a fastener element being molded in a cavity of a mold screen (with resin filling the cavity).

Referring to FIG. 10, cavities shaped to form the fastener elements described herein can be defined in a sleeve 70 fit tightly to an outer surface of a cylindrical core 72 of mold roll 62, with the cavities extending all of the way through the sleeve such that the flat upper surfaces of the fastener element heads are formed on the outer core surface. Methods of laser cutting using a pulsed fiber laser, tilting the beam axis as it travels about the cavity perimeter, are capable of forming cavities of this shape and size in stainless steel, in some cases followed by a light etch. Screens with such cavities can also be made by electroforming techniques.

While a number of examples have been described for illustration purposes, the foregoing description is not intended to limit the scope of the invention, which is defined by the scope of the appended claims. There are and will be other examples and modifications within the scope of the following claims.

What is claimed is:

1. A male touch fastener product, comprising
a base sheet having a resin side surface; and
a male touch fastener element comprising a resin stem extending integrally from the resin side surface of the base sheet; and a head disposed at a distal end of the stem and overhanging the base sheet on at least three sides of the stem, the head having an underside surface of resin;

wherein the resin side surface of the base sheet, the stem, and the underside surface of the head together form a seamless mass of resin;

wherein the head has an overall shape, as projected in a plane parallel to the base sheet side surface, with a perimeter and an area defining a centroid;

wherein the perimeter defines at least three spaced-apart, externally facing extremities that correspond to head sections of different engagement characteristics and are disposed at different distances from the centroid, the different distances differing from each other by at least fifteen percent of the largest of the different distances.

2. The male touch fastener product of claim 1, wherein the head has an upper surface that is generally flat over most of the area of the projected shape of the head, including at the centroid.

3. The male touch fastener product of claim 2, wherein the upper surface is generally parallel to the side surface of the base sheet.

4. The male touch fastener product of claim 1, wherein the extremities are all rounded corners of the perimeter, connected by perimeter side edges.

5. The male touch fastener product of claim 4, wherein at least three of the corners are of different curvature.

6. The male touch fastener product of claim 4, wherein at least three of the side edges are of different lengths.

7. The male touch fastener product of claim 6, wherein the different lengths differ from each other by at least ten percent of the largest of the lengths.

8. The male touch fastener product of claim 1, wherein the extremities comprise centers of two convex arc segments and a center of one concave arc segment connecting the convex arc segments.

9. The male touch fastener product of claim 1, wherein the perimeter consists of four arc segments.

10. The male touch fastener product of claim 1, wherein the projected shape of the head is non-symmetric about all lines parallel to the base sheet.

11. The male touch fastener product of claim 1, wherein the base sheet comprises a layer of resin laminated to a carrier sheet and covering only a limited area of the carrier sheet, such that the carrier sheet is exposed beyond the base sheet.

12. The male touch fastener product of claim 1, wherein the fastener element extends to less than 0.5 millimeter from the side surface of the base sheet.

13. The male touch fastener product of claim 1, wherein the fastener element is one element of an array of fastener elements extending from the side surface of the base sheet in a density of at least 150 fastener elements per square centimeter.

14. A male touch fastener product, comprising
a base sheet having a resin side surface; and
a male touch fastener element comprising
a resin stem extending integrally from the resin side surface of the base sheet; and
a head disposed at a distal end of the stem and overhanging the base sheet on at least three sides of the stem, the head having an underside surface of resin;
wherein the resin side surface of the base sheet, the stem, and the underside surface of the head together form a seamless mass of resin;
wherein the head has an overall shape, as projected in a plane parallel to the base sheet side surface, with a polygonal perimeter consisting of straight edges connected at rounded corners; and
wherein for each group of three adjacent edges of the perimeter, all of the edges of the group are of different lengths.

15. The male touch fastener product of claim 14, wherein all edges of the perimeter are of different lengths.

16. The male touch fastener product of claim 14, wherein the different lengths differ from each other by at least ten percent of the largest of the lengths.

17. A male touch fastener product, comprising
a base sheet having a resin side surface; and
a male touch fastener element comprising
a resin stem extending integrally from the resin side surface of the base sheet; and
a head disposed at a distal end of the stem and overhanging the base sheet on at least three sides of the stem, the head having an underside surface of resin;
wherein the resin side surface of the base sheet, the stem, and the underside surface of the head together form a seamless mass of resin;
wherein the head has an overall shape, as projected in a plane parallel to the base sheet side surface, with a perimeter and an area defining a centroid;
wherein the perimeter comprises an unbroken series of at least three arc segments of different curvature; and
wherein centers of the arc segments are disposed at different distances from the centroid.

18. The male touch fastener product of claim 17, wherein the different distances from the centroid differ from each other by at least ten percent of the largest of the distances.

19. The male touch fastener product of claim 18, wherein the different distances from the centroid differ from each other by at least fifteen percent of the largest of the distance.

* * * * *